United States Patent [19]
Sasaki et al.

[11] Patent Number: 5,558,294
[45] Date of Patent: Sep. 24, 1996

[54] RETRACTOR FOR SEAT BELT

[75] Inventors: Takanobu Sasaki; Kazumi Hirata, both of Kanagawa, Japan

[73] Assignee: NSK Ltd., Tokyo, Japan

[21] Appl. No.: 329,255

[22] Filed: Oct. 26, 1994

[30] Foreign Application Priority Data

Oct. 26, 1993 [JP] Japan ................... 5-062079 U

[51] Int. Cl.⁶ .................................................. B65H 75/48
[52] U.S. Cl. .................... 242/377; 242/381.4; 297/475
[58] Field of Search .................... 297/475; 242/381.1, 242/381.3, 381.4, 377; 280/804

[56] References Cited

U.S. PATENT DOCUMENTS

| | | | |
|---|---|---|---|
| 3,811,703 | 5/1974 | Turkovich | 242/377 X |
| 3,814,346 | 6/1974 | Carter | 242/381.1 |
| 4,369,931 | 1/1983 | Föhl | 242/377 |
| 4,422,593 | 12/1983 | Takada | 242/381.1 X |
| 4,431,233 | 2/1984 | Ernst | 297/475 X |
| 4,519,555 | 5/1985 | Tukamoto | 242/381.4 |
| 4,634,075 | 1/1987 | Oxley et al. | 242/381.3 X |
| 4,832,280 | 5/1989 | Haland et al. | 242/377 |
| 4,902,041 | 2/1990 | Corbett et al. | 280/807 |
| 5,076,610 | 12/1991 | Struck | 280/806 |
| 5,137,226 | 8/1992 | Fujimura et al. | 242/107.2 |
| 5,176,225 | 1/1993 | Honl et al. | 242/107.40 |

FOREIGN PATENT DOCUMENTS

| | | | |
|---|---|---|---|
| 2820029 | 11/1979 | Germany | 242/377 |
| 2828399 | 1/1980 | Germany | 242/377 |
| 2854635 | 10/1980 | Germany | 242/381.1 |

*Primary Examiner*—Peter M. Cuomo
*Assistant Examiner*—David E. Allred
*Attorney, Agent, or Firm*—Sughrue, Mion, Zinn, Macpeak & Seas

[57] ABSTRACT

A retractor for a seat belt includes a retractor base, a bobbin fixed to a winding shaft rotatably supported to the retractor base for winding a webbing, and a webbing guide having a first positioning portion located on the side of the bobbin and a second positioning portion located on the side of the upper end of the retractor base. The webbing guide is fixed to the retractor base for regulating a webbing moving path so that the webbing wound around the bobbin is drawn out from a prescribed position on said retractor base. The first and second positioning portions each has a protrusion portion provided with a plurality of protrusions abutting on the surface of said webbing and the surface of each protrusion abutting on said webbing forms a smooth bending face. The retractor provides a small change in the contact resistance between the webbing and the webbing guide positioning the webbing in a retractor base and can maintain smoothness of the draw-out and winding operations of the webbing, so that it is effective to improve the reliability of the draw-out and winding operations in the retractor and also general versatility of the retractor.

12 Claims, 8 Drawing Sheets

RETRACTOR FOR SEAT BELT

BACKGROUND OF THE INVENTION

The present invention relates to a retractor in which a seat belt is wound so that it can be drawn out, and more particularly to a retractor equipped with a webbing guide located adjacent to a bobbin for winding a seat belt to define a belt moving path.

Figure 17:
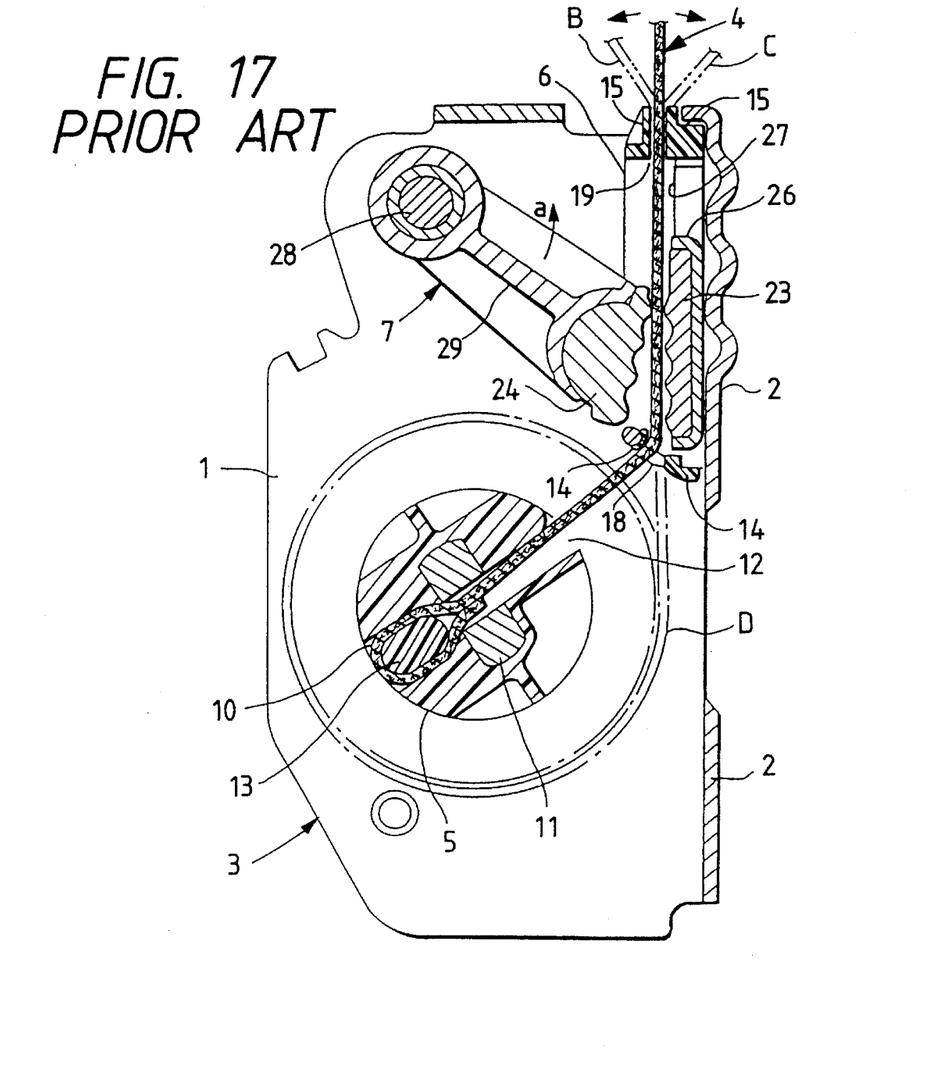
FIG. 17 is a sectional view of the conventional retractor.

Conventionally, retractors (winding devices) have been used to retract or wind seat belts for holding occupants in a vehicle safely to seats, and are constructed as shown in e.g. FIG. 17.

The retractor as shown is a retractor equipped with a clamping mechanism disclosed in e.g. U.S. Pat. No. 5,137,226. The retractor is composed of a retractor base 3 made from a metal plate having a pair of opposite side walls 1 and a rear plate 2 (bottom plate) connecting them to each other and attached to a fixed structure (e.g. car body), a bobbin 5 around which a webbing 4 is wound which is rotatably supported by both side walls 1 so as to serve as a seat belt, a webbing guide 6 fixed to a retractor base 3 so that the webbing 4 is drawn out from a predetermined position on the retractor base 3, and a clamping mechanism 7 which clamps the webbing 4 positioned at the predetermined position by the webbing guide 6 so as to inhibit the drawing out of the webbing 4.

Incidentally, the end of the webbing is formed to have a loop portion 10 capable of receiving a shaft member. On the other hand, the bobbin 5 is fixed to a winding shaft 11 which penetrates through its central portion, and is rotatably supported by the pair of side walls 1 of the retractor base 3. The bobbin rotates integrally with the winding shaft 11. Further, the bobbin 5 has a slit-like opening 12 into which the loop portion 10 of the webbing 14 is inserted. The end of the webbing 4 is fixed to the bobbin 5 so that the shaft member 13 fixed to the bobbin 5 is received in the loop portion 10 inserted into the bobbin 5 from the opening 12.

Although not shown, usually, on one side of the winding shaft 11 rotatably supported to the retractor base 3, a winding spring device is arranged to bias the bobbin 5 in a webbing winding direction. On the other side of the winding shaft 11, an emergency locking mechanism is provided to detect the occurrence of an emergency from a speed change due to an abrupt braking operation or collision so that a locking hook is locked with a hook wheel integral to the winding shaft 11 or bobbin 5, thereby inhibiting the rotation of the bobbin 5 in a webbing drawing out direction.

Figure 18:
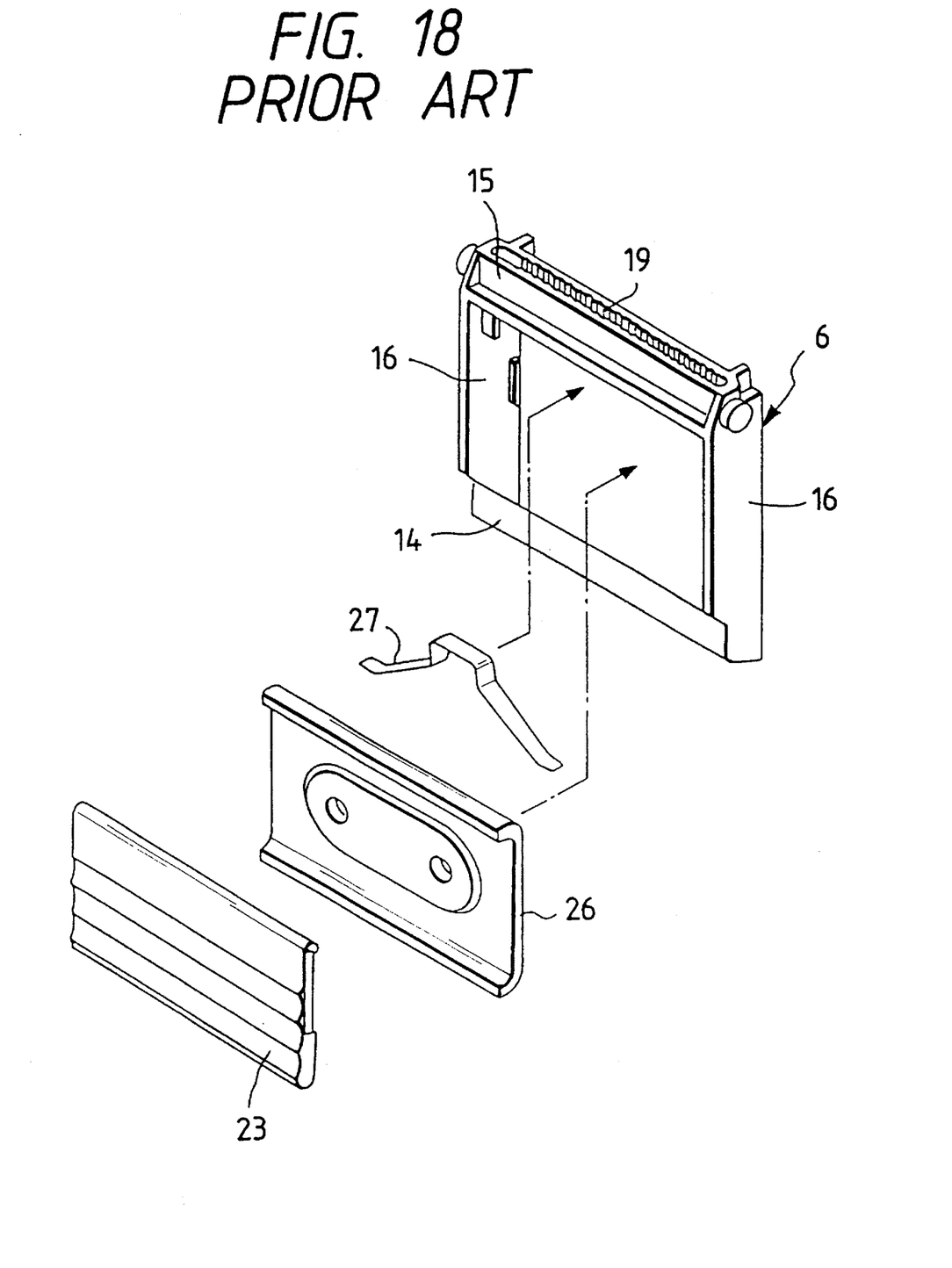
FIG. 18 is a perspective view of the conventional retractor.

The webbing guide 6 defines or regulates the position of the webbing 4 so that the webbing 4 goes in and out at a predetermined position on the retractor base 3 when the webbing 4 wound around the bobbin 5 is drawn out or wound. In the case of this example, as also shown in FIG. 18, the webbing guide is fixed to the retractor base 3 in the neighborhood of the bobbin 4 and has a structure composed of a first positioning portion 14 and a second positioning portion 15. The respective positioning portions 14 and 15, as seen from FIG. 17, have the corresponding through-holes 18 and 19 for inserting the webbing 14. The peripheral wall of each of the through-holes 18 and 19 of the positioning portions 14 and 15 abuts on the surface of the webbing 4 to regulate the position of the webbing 4 so that the webbing 4 moves while it is parallel to the rear plate 2 of the retractor base 3.

As described above, upon occurrence of an emergency such as abrupt braking or collision, the emergency locking mechanism operates to inhibit the rotation of the bobbin 5 towards the webbing draw-out direction. But, generally, in the bobbin 5, an excess winding amount of the webbing 4 is so set that a suitable length of the webbing 4 remains on the bobbin 5 even when a seat belt is being used. For this reason, even when the emergency locking mechanism operates, the tension acting on the webbing 4 tightens the winding of the webbing 4 remaining on the bobbin 5 so that a length of the webbing 4 is drawn out due to tightening in the webbing wound on bobbin 5. As a result, the restriction of the occupants may be attenuated.

The clamping mechanism 7 serves to inhibit the drawing out of the webbing 4 due to the tightening of the webbing 4 remaining on the bobbin 5. In the illustrated example, the clamping mechanism 7 inhibits the drawing out of the webbing 4 in such a way that the webbing 4 is held by a pair of locking plates 23 and 24 each having a wavy surface abutting the webbing 4 between the positioning portions 14 and 15.

The locking plate 23 arranged between the webbing 4 and the rear plate 2 of the retractor base 3, as seen from FIG. 18, is held on e.g., a saucer-like holder 26 which is supported vertically slidably along the rear plate 2 by a pair of side plate portions 16 of the webbing guide 6. The holder 26 is forced downward by a spring 27 located between the upper end of the holder 26 and the lower end of the second positioning portion 15. On the other hand, the locking plate 24, as seen from FIG. 17, is held on the end of an arm 29 which can swing on a shaft 28 hung between a pair of side walls 1 of the retractor base 3. In this case, the arm 29 serves to operate in linkage with the emergency locking mechanism (not shown). In an emergency state when the emergency locking mechanism inhibits the rotation of the bobbin 5 in the webbing draw-out direction, the arm 29 swings in the direction of an arrow a to push the locking plate 24 on the webbing and locking plate 23. Thus, the pair of locking plates 23 and 24 hold the webbing 4 to inhibit its drawing out motion.

The conventional retractor as shown in FIG. 17 has been installed for use in such a manner that the direction of drawing out the webbing 4 from the retractor base 3 is in parallel to the rear plate 2 of the retractor base 3. For example, the upper end surface in which the inserting through-hole 19 of the second positioning portion 15 forms a flat surface orthogonal to the inserting-through direction of the through-hole 19.

However, the direction of drawing out the webbing 4 from the retractor base 3 is decided depending on many conditions such as the manner of drawing out the webbing in use (draw-out path), the shape of a fixed structure (e.g. car body) to which the retractor base 3 is attached, etc. Therefore, actually, it is not easy to install the retractor 4 so that the direction of drawing out the webbing 4 from the retractor base 3 is in parallel to the rear plate 2 of the retractor base 3. For example, where common retractors are installed in vehicles having different body shapes, attachment metal fittings for position regulating to be arranged between the body and retractor base 3 must be individually prepared for each type of vehicle. If not, like state B or state C as shown by two-dot chain lines in FIG. 17, the direction of the webbing 4 drawn out from the retractor base 3 may be greatly altered.

When the direction of drawing out the webbing 4 is greatly tilted from the defined direction, in the conventional retractor, the surface of the webbing 4 is brought into intimate contact with the upper angled portion of the inserting through-hole 19 of the second positioning portion 15 thereby to increase the contact resistance. As a result, smoothness of the draw-out and winding operations may be hindered.

The amount of the webbing 4 between the bobbin 5 and the first positioning portion 14 changes in accordance with the winding diameter of the webbing 4 on the bobbin 5. According to the conventional retractor, although the contact angle of the webbing 4 at the first positioning portion 14 changes in accordance with the winding diameter of the webbing 4 on the bobbin 5, the abutting face of the first positioning portion 14 on the webbing 4 is a simple continuous curve. Therefore, when the diameter of the webbing 4 decreases to tilt the webbing 4 greatly for the first positioning portion 14, the contact area increases to increase the contact resistance. As a result, smoothness of the drawing out and winding operations is hindered.

Further, it should be noted that the length of the webbing 4 drawn out from the retractor base 3 when a seat belt is being used depends on the size of a seat, the occupant's body shape, the position where the retractor base 3 on the body is attached, etc. Therefore, in order to increase general versatility so that one kind of retractor can be applied to plural vehicle types, the maximum winding capacity of the webbing 4 on the bobbin 5 must be increased. Thus, even if the winding diameter of the webbing 4 changes greatly, the contact resistance between the first positioning portion 14 and the webbing 4 should not change.

But, in the conventional first positioning portion 14 as shown in FIG. 17, the continuous simple curve is provided on only the side of the bobbin 5 to abut on the surface of the webbing 4. Thus, when the winding diameter of the webbing 4 on the bobbin 5 is set at so large a value that the webbing path deviates to the side of the rear plate 2, the contact resistance increases at the angled portion of the first positioning portion 14 on the side of the rear plate 2. Therefore, it is difficult to increase the maximum winding capacity of the webbing 4 in order to increase the general versatility of the device.

SUMMARY OF THE INVENTION

An object of the present invention is to solve the problems described above to provide a retractor which regardless of changes in the winding amount of a webbing in the retractor, direction of drawing out the webbing from the retractor due to the arrangement format of the retractor, etc., minimizes the change in the contact resistance between the webbing and the webbing guide for positioning the webbing in a retractor base and can maintain smoothness of the draw-out and winding operations of the webbing, thereby improving the reliability of the drawing out and winding operations in the retractor and also general versatility.

In accordance with a first aspect of the present invention, there is provided a retractor for a seat belt having a retractor base, a bobbin fixed to a winding shaft rotatably supported to the retractor base for winding a webbing, and a webbing guide having a first positioning portion located on the side of the bobbin and a second positioning portion located on the side of the upper end of the retractor base, said webbing guide being fixed to the retractor base for regulating a webbing moving path so that the webbing wound around the bobbin is drawn out from a predetermined position on said retractor base, said first and said second positioning portions each having a protrusion portion provided with a plurality of protrusions abutting on the surface of said webbing, the surface of each protrusion abutting on said webbing forming a smooth bending face.

In accordance with a second aspect of the present invention, there is provided a retractor for a seat belt providing a retractor base, a bobbin fixed to a winding shaft rotatably supported to the retractor base for winding a webbing, and a webbing guide fixed to the retractor base so that the webbing wound around the bobbin is drawn out from a predetermined position on the retractor base, wherein the webbing guide includes a first positioning portion having a first bending plate located on the side of the bobbin and bent toward a rear plate of the retractor base and a first protrusion portion provided on said first bending plate and provided with a plurality of protrusions abutting on the surface of the webbing, and a second positioning portion having a second bending plate located on the side of the upper end of the retractor base and bent toward the rear plate of the retractor base, a third bending plate facing with and bent opposite to the second bending plate, and second and third protrusion portions provided on the second and third bending plates, respectively and provided with a plurality of protrusions abutting on the surface of the webbing.

In accordance with a third aspect of the present invention, there is provided a retractor having a clamping mechanism for directly clamping a webbing in an emergency of a vehicle, providing a retractor base; a bobbin fixed to a winding shaft rotatably supported to the retractor base for winding a webbing; a movable clamping member; a lower plate fixed the retractor base for holding the webbing between itself and the clamping member; an inner lever for moving the clamping member in a webbing holding direction; a dust cover covering the outer periphery of the retractor base and attached to the retractor base; and a webbing guide fixed to the retractor base so that the webbing wound around the bobbin is drawn out from a predetermined position on the retractor base, wherein said webbing guide includes a first positioning portion provided near the bobbin and a second positioning portion provided at a position serving as an outlet of the webbing from the retractor base, and the first positioning portion is formed integrally to the inner lever and the second positioning portion is formed integrally to the dust cover.

In accordance with the present invention, the positioning portion of the webbing guide abutting on the surface of the webbing is formed by a protrusion portion having a plurality of protrusions which are arranged separately from one another, and the surface of each protrusion in contact with the webbing forms a smooth bending face. In comparison with the conventional webbing guide in which a continuous simple bending face abuts on the surface of the webbing, the webbing guide according to the present invention can greatly decrease the contact area of the positioning portion with the webbing and improve smoothness between the positioning portion and the webbing. Thus, regardless of changes in the winding amount of a webbing in the retractor, direction of drawing out the webbing from the retractor due to the arrangement format of the retractor, etc., the retractor according to the present invention provides a small change in the contact resistance between the webbing and the webbing guide for positioning the webbing in a retractor base and can maintain smoothness of the drawing out and winding operations of the webbing, thereby improving the reliability of the drawing out and winding operations in the retractor and also the versatility of the retractor.

DETAILED DESCRIPTION OF THE PREFERRED EMBODIMENTS

Now referring to the drawings, a detailed explanation will be given of several embodiments of the present invention.

Figure 1:
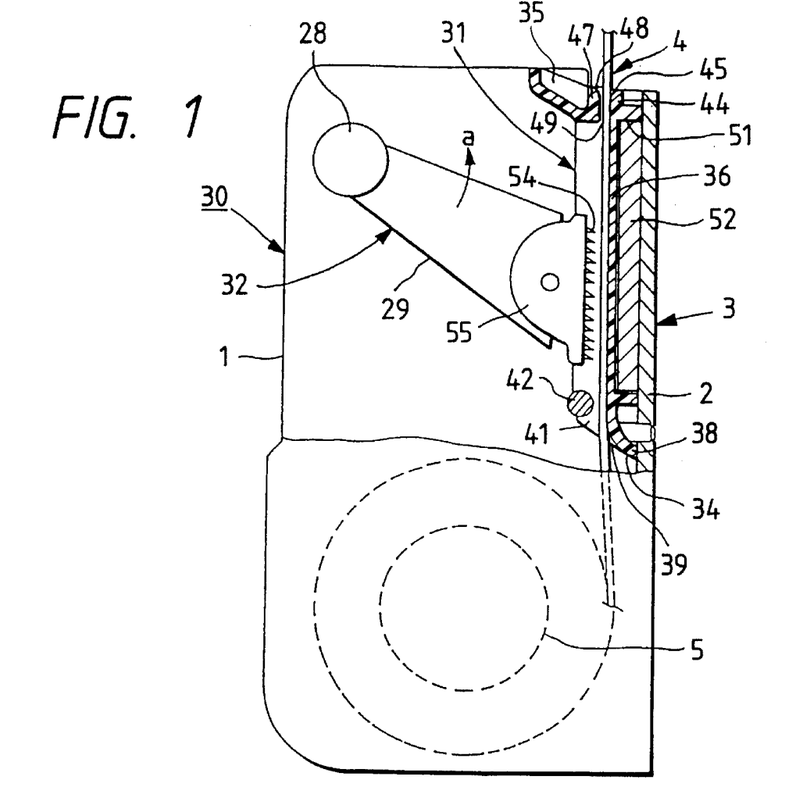
FIG. 1 is a longitudinal sectional view of the retractor equipped with the webbing guide according to the first embodiment of the present invention.
Figure 2:
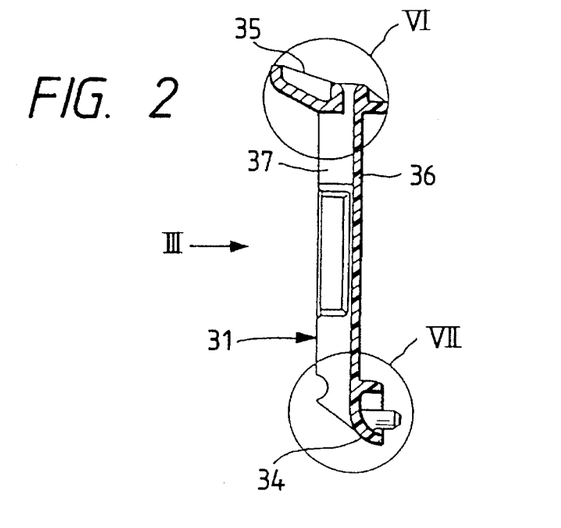
FIG. 2 is a longitudinal sectional view of the webbing guide according to the first embodiment of the present invention.
Figure 3:
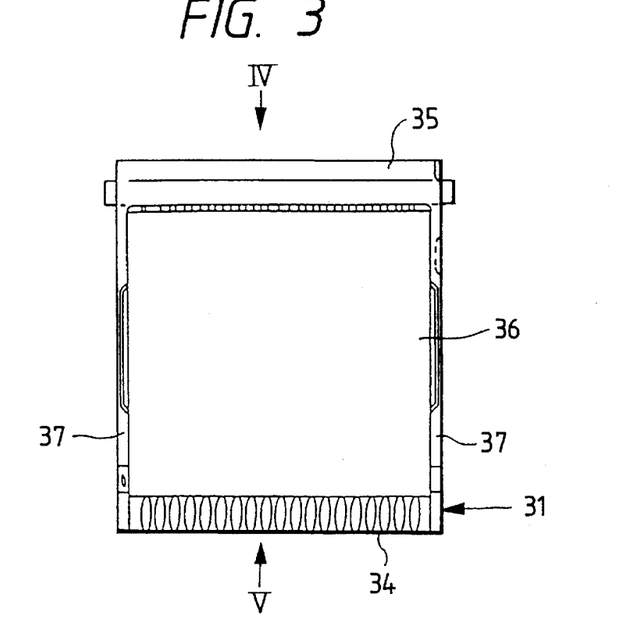
FIG. 3 is a view viewed from the direction of an arrow III in FIG. 2.

FIG. 1 is a sectional view of the retractor equipped with the webbing guide according the first embodiment to the present invention.

The retractor 30 as shown in FIG. 1 is a retractor equipped with a clamping mechanism. The retractor is composed of a retractor base 3 made from a metal plate having a pair of opposite side walls 1 and a rear plate 2 (bottom plate) connecting them to each other and attached to a fixed structure (e.g. car body), a bobbin 5 around which a webbing 4 is wound which is fixed to a winding shaft 11 rotatably supported to the pair of side walls 1 of the retractor base 3 to serve as a seat belt, a webbing guide 31 fixed to the retractor base 3 so that the webbing 4 is drawn out from a predetermined position on the retractor base 3, and a clamping mechanism 32 which holds the webbing 4 positioned at the predetermined position by the webbing guide 31 to inhibit the draw-out of the webbing 4.

The components other than the webbing guide 31 and clamping mechanism 32 have the same structures as in the conventional retractor as shown in FIG. 17, and further explanation thereof is omitted.

The webbing guide 31 regulates the position of the webbing 4 so that the webbing 4 goes in and out a predetermined position on the retractor base 3 while the webbing 4 wound around the bobbin 5 is being drawn out or the webbing 4 is wound. In this embodiment, as shown in FIGS. 2 to 7, the webbing guide 31 is composed of a first positioning portion 34 fixed at a predetermined position on the retractor base 3 in the neighborhood of the bobbin 5, a second positioning portion 35 fixed at another predetermined position on the upper end of the retractor base 3, a rear plate portion 36 coupling the first and second positioning portions 34 and 35 with each other, and a pair of side plate portions 37 which are vertically arranged on both side ends of the rear plate portion 36 and couple the first and second positioning portions 34 and 35. These components are integrally formed by synthetic resin.

Figure 5:
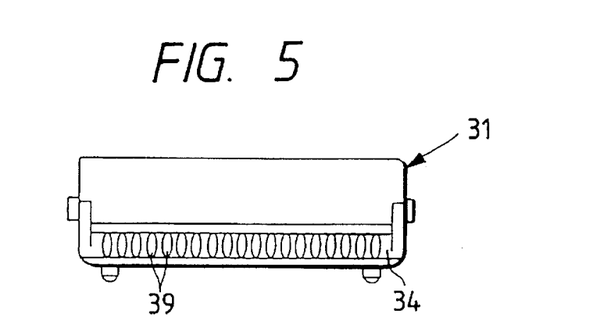
FIG. 5 is a view viewed from the direction of an arrow V in FIG. 3.
Figure 7:
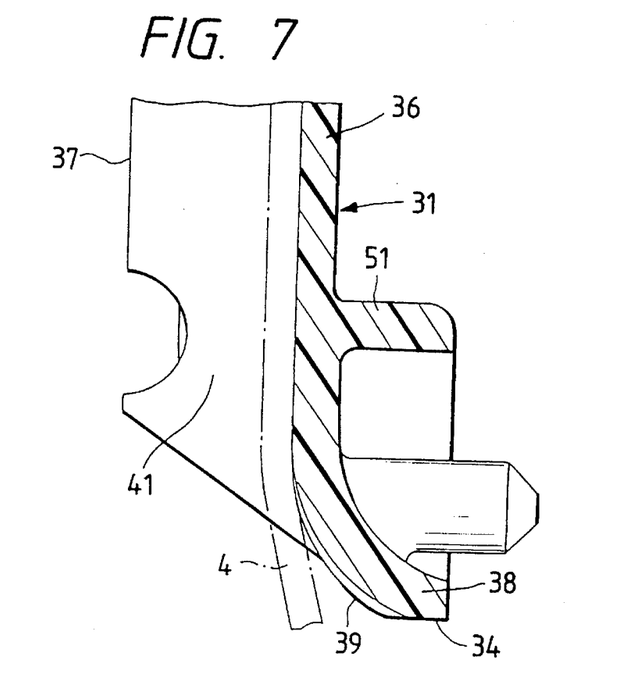
FIG. 7 is a view for explaining the operation at an area VII in FIG. 2.

As seen from FIGS. 1, 5 and 7, the first positioning portion 34 located on the side of the bobbin 5 is composed of a first bending plate portion 38 which extends out from the lower end of the rear plate portion 36 and is bent towards the rear plate 2 of the retractor base 3, a first protrusion portion having a plurality of protrusions 39 which are separately arranged on the first bending plate portion 38 to abut on the surface of the webbing 4, and a cylindrical holding rod 42 extended between the pair of side plate portions 37 to form a first inserting through-hole 41 for inserting the webbing 4 between the holding rod 42 and the first protrusion portion 39. The protrusions 39 of the first protrusion portion, which are formed at regular intervals in the direction of the width of the webbing 4, form substantially spindle-shapes along the longitudinal direction of the webbing 4 and have smooth bending surfaces in contact with the webbing 4.

Figure 4:
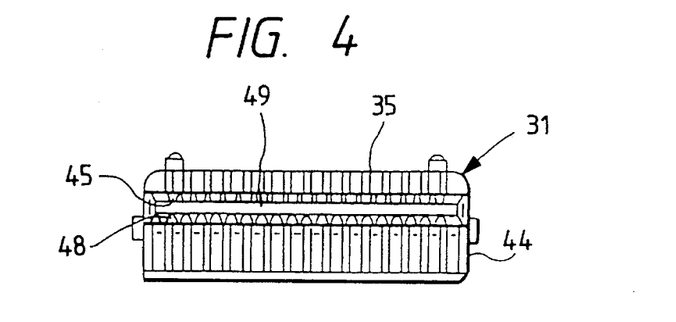
FIG. 4 is a view viewed from the direction of an arrow IV in FIG. 3.
Figure 6:
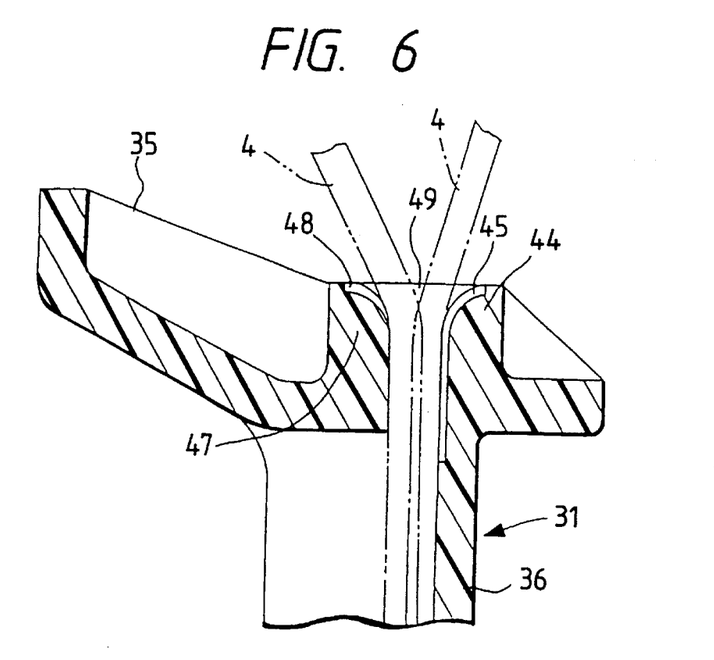
FIG. 6 is a view for explaining the operation at an area VI in FIG. 2.

As seen from FIGS. 1, 4 and 6, the second positioning portion 35 located on the upper side of the tractor base 3 is composed of a second bending plate portion 44 which extends out from the upper end of the rear plate portion 36 and is bent towards the rear plate 2 of the retractor base 3, a second protrusion portion 45 having a plurality of protrusions which are separately arranged on the second bending plate portion 44 to abut on the surface of the webbing 4 a third bending plate portion 47 facing with and bent opposite to the second bending plate portion 44, and a third protrusion portion 48 having a plurality of protrusions which are separately arranged on the third bending plate portion 47 so a to abut on the surface of the webbing 4. The gap between the second protrusion portion 45 and the third protrusion portion 48 forms a second inserting through-hole 49 for inserting the webbing 4. The protrusions of the each of the second and third protrusion portions 44 and 48, which are formed at regular intervals in the direction of the width of the webbing 4, for substantially spindle-shapes along the longitudinal direction of the webbing 4 and have smooth bending surfaces in contact with the webbing 4.

The rear plate portion 36 of the webbing guide 31 has a hollow portion 51 formed on the side of rear plate 2 of the retractor base 3. The hollow portion 51 is filled with a metallic lower plate 52 which is an reinforcement plate. The webbing guide 31 thus formed is fixed to the rear plate 2 of the retractor base 3 with the metallic lower plate 52 by a screw (not shown).

The clamping mechanism 32 serves to inhibit the drawing out of the webbing 4 due to the tightening of the webbing 4 remaining on the bobbin 5. In this embodiment, the clamping mechanism 32 inhibits the drawing out of the webbing 4 in such a way that a clamping member 55 provided with a large number of locking protrusions 54 for clamping and engaging the webbing 4 is pushed on the webbing 4 of the rear plate portion 36 of the webbing guide 31. The clamping member 55 is held on the end of an arm 29 which can swing on a shaft 28 hung between a pair of side wall portions 1 of the retractor base 3. In this case, the arm 29 serves to operate in linkage with the emergency locking mechanism (not shown). In an emergency state when the emergency locking mechanism inhibits the rotation of the bobbin 5 in the webbing drawing out direction, the arm 29 swings in a direction of an arrow a to push the clamping member 55 onto the webbing 4 on the rear plate portion 36 of the webbing guide 31, thereby inhibiting the drawing out of the webbing 4. Thus, the arm 29 is biased by a spring member (not shown) in a direction opposite to the arrow a so that the clamping member 55 is not brought into contact with the webbing 4 of the rear plate portion 36 except in an emergency state.

The webbing guide 31 positions the webbing 4 so as to be movable while parallel to the rear plate portion 36 between a pair of positioning portions 34 and 35 in such a manner that as shown in FIGS. 6 and 7, the webbing 4 is inserted through the first inserting through-hole 41 of the first positioning portion 34 and through the second inserting through-hole 49 of the second positioning portion 35. When the webbing 4 is drawn out from the second positioning portion 35 to the outside of the retractor base 3, as shown in FIG. 6, the drawing out direction is inclined toward the rear plate portion 36 depending on conditions such as the manner of drawing out the webbing in use, the position and the shape of the car body to which the retractor 30 is attached, etc.

However, the surface of the webbing 4 will abut on the second protrusion portion 45 or third protrusion portion 48 each having a plurality of protrusions which have smooth bending surfaces and are arranged separately from one another. In comparison with the conventional webbing guide in which a continuous simple bending face abuts on the surface of the webbing, the webbing guide according to the present invention can greatly decrease the contact area of the second positioning portion 35 with the webbing 4 and improve smoothness between the second positioning portion 35 and the webbing 4.

Further, where the amount of winding 4 on the bobbin 5 is increased, as shown in FIG. 7, the webbing 4 is brought into contact with the first protrusion portion having protrusions 39 of the first positioning portion 34 so that it is wound around the protrusion portion 39. In this case also, in comparison with the conventional webbing guide in which a continuous simple bending face abuts on the surface of the webbing, the webbing guide according to the present invention can greatly decrease the contact area of the first positioning portion 34 with the webbing 4 and improve smoothness between the first positioning portion 34 and the webbing 4.

Thus, regardless of changes in the winding amount of a webbing in the retractor, direction of drawing out the webbing from the retractor due to the arrangement format of the retractor, etc., the retractor according to the present invention provides a minimal change in the contact resistance between the webbing 4 and the webbing guide 31 for positioning the webbing 4 in a retractor base 3 and can maintain smoothness of the drawing out and winding operations of the webbing 4, thereby improving the reliability of the drawing out and winding operations in the retractor 30 and also general versatility of the retractor 30.

Figure 8:
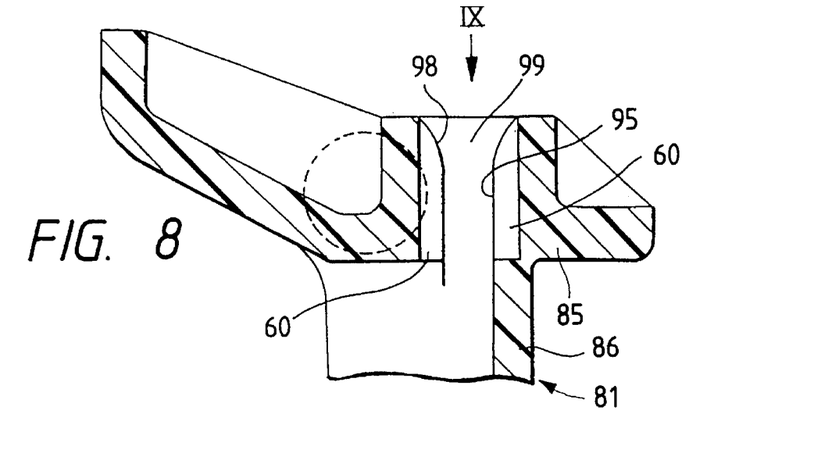
FIG. 8 is an enlarged view of a main part of the webbing guide according to the second embodiment of the present invention.
Figure 9:
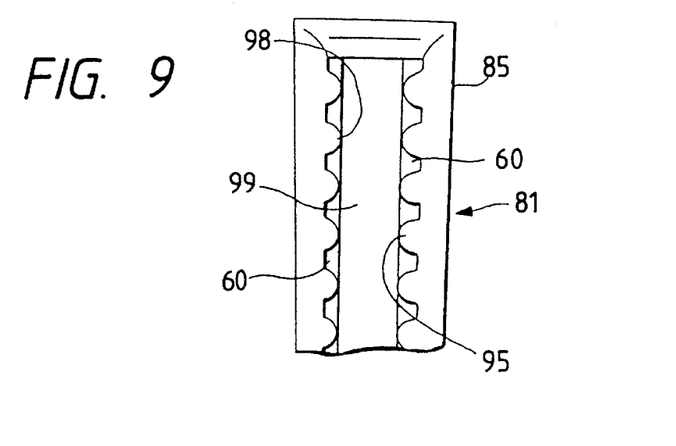
FIG. 9 is a view viewed from the direction of an arrow IX in FIG. 8.
Figure 10:
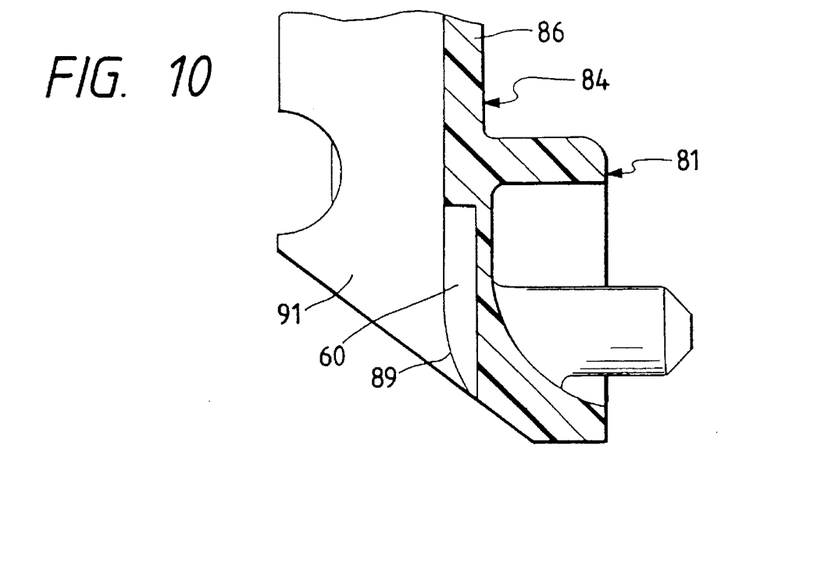
FIG. 10 is an enlarged view of another main part of the webbing guide according to the second embodiment of the present invention.

FIGS. 8 to 10 show the second embodiment of the present invention. This embodiment is different from the first embodiment in the formats of a first protrusion portion 89 of a first positioning portion 84 of a webbing guide 81 and a second and a third protrusion portion 95 and 98 of a second positioning portion 85. In this case, as seen from FIG. 9, the respective protrusion portions 89, 95 and 98 are provided in the width direction of the webbing 4 at the positioning portions 84 and 85. The end of each of the protrusions in these protrusion portions which abut on the surface of the webbing is formed in an R-shape. Each concave portion 60 between the protrusions is so formed that a groove having a predetermined depth is cut along a rear plate portion 86 over a predetermined length. Such a format in this embodiment makes it easy to machine the molds for obtaining the respective protrusion portions 89, 95 and 98. As in the first embodiment, the webbing guide according to this embodiment can also greatly decrease the contact area of each of the positioning portions 84 and 85 with the webbing 4 and improve smoothness between each positioning portion and the webbing 4.

Figure 11:
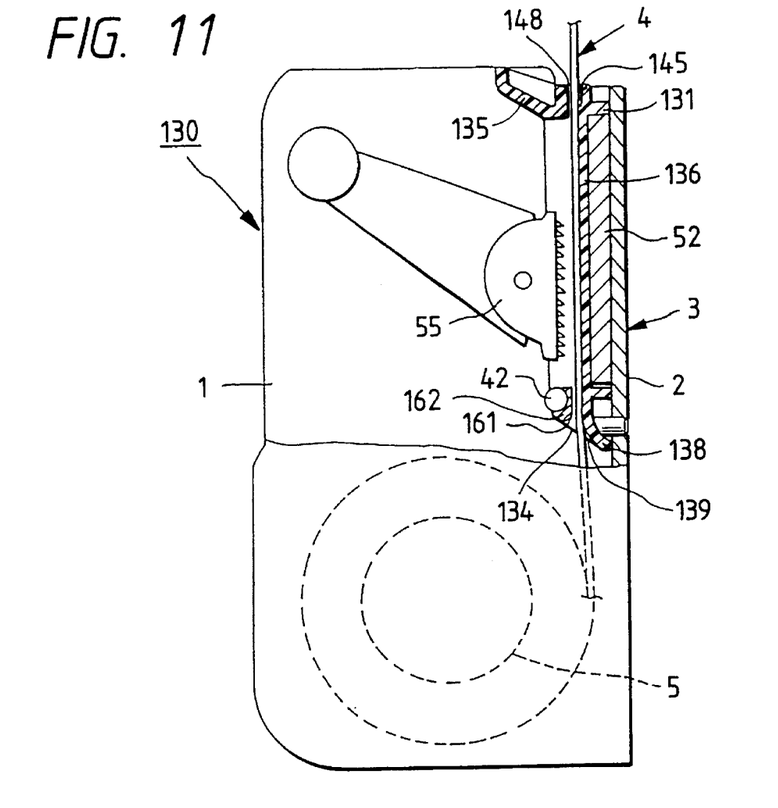
FIG. 11 is a longitudinal sectional view of the retractor equipped with the webbing guide according to the third embodiment of the present invention.
Figure 12:
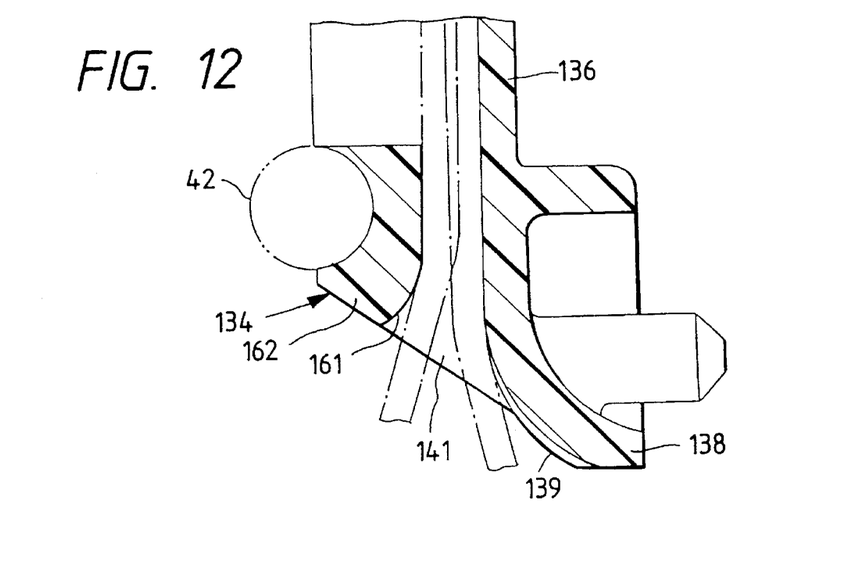
FIG. 12 is an enlarged view of the main part of the webbing guide according to the third embodiment of the present invention.

FIG. 11 shows the third embodiment of the present invention. A webbing guide 131 according to this embodiment partially improves the first positioning portion 34 of the webbing guide 31 in the first embodiment. Specifically, in the first embodiment, when the winding diameter of the webbing 4 wound around the bobbin 5 decreases, the webbing 4 is caused to abut on the holding rod 42. On the one hand, in this embodiment, as shown in FIG. 12, at a first positioning portion 134, a first bending plate portion 138 is provided which extends out from the lower end of a rear plate portion 136 and bent toward the rear plate 2 of the retractor base 3. A fourth bending plate portion 162 is provided along the holding rod 42 which faces with and bent opposite to the first bending plate portion 138. Further, a fourth protrusion portion 161 is provided which has a plurality of protrusions with smooth bending surfaces to abut on the surface of the webbing 4 and formed separately with suitable intervals on the fourth bending plate portion 162.

Such an arrangement makes it possible to decrease the contact resistance between the webbing 4 and the first positioning portion 134 when the winding diameter of the webbing wound around the bobbin 5 decrease, thus improving sliding between the first positioning portion 134 and the webbing 4. Incidentally, the shape of the first protrusion portion 139 of the first bending plate portion 138, the arrangement of the second and third bending plate portions provided at the second positioning portion 135 and the second and third protrusion portions 145 and 148 provided at the second and third bending plate portions are the same as in the first embodiment and so are not further explained.

Figure 13:
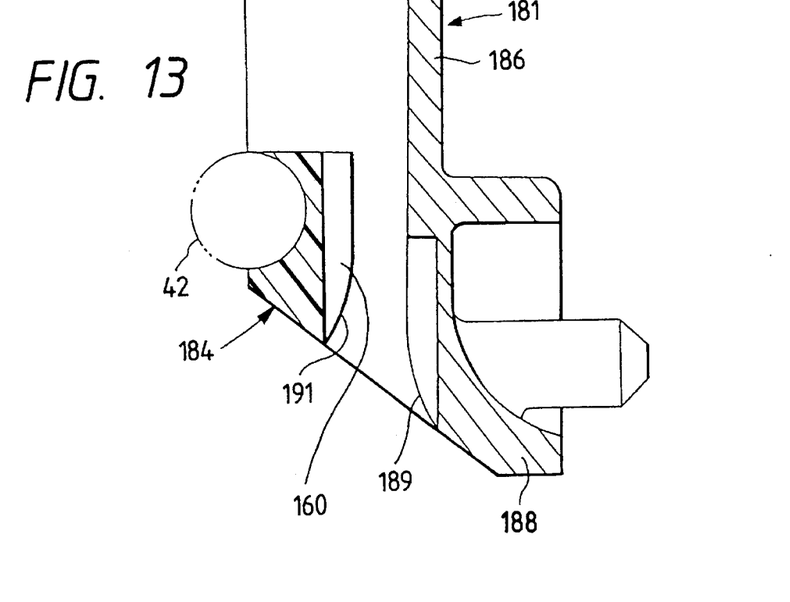
FIG. 13 is an enlarged view of the main part of the webbing guide according to the fourth embodiment of the present invention.

FIG. 13 shows the fourth embodiment In a webbing guide 181 according to the fourth embodiment, the first to fourth protrusion portions in the webbing guide 131 according to the third embodiment are formed in the same manner as in the second embodiment. Specifically, the end of each of the protrusions in these protrusion portions which abut on the surface of the webbing is formed in an R-shape. Each concave portion 160 between the protrusions is so formed that a groove having a predetermined depth is cut over a predetermined length. Incidentally, although FIG. 13 shows only the first positioning portion 184, the second positioning portion is formed in the same manner and has the same shape as in FIG. 9.

In the embodiments described above, although the first and second positioning portions are formed as an integrated molded element they may be formed as separate bodies. As the case may be (in accordance with the maximum winding amount of the webbing, installing positions of the webbing guide), the first and second positioning portions are not necessarily both provided, but a single positioning portion may be provided.

Figure 14:
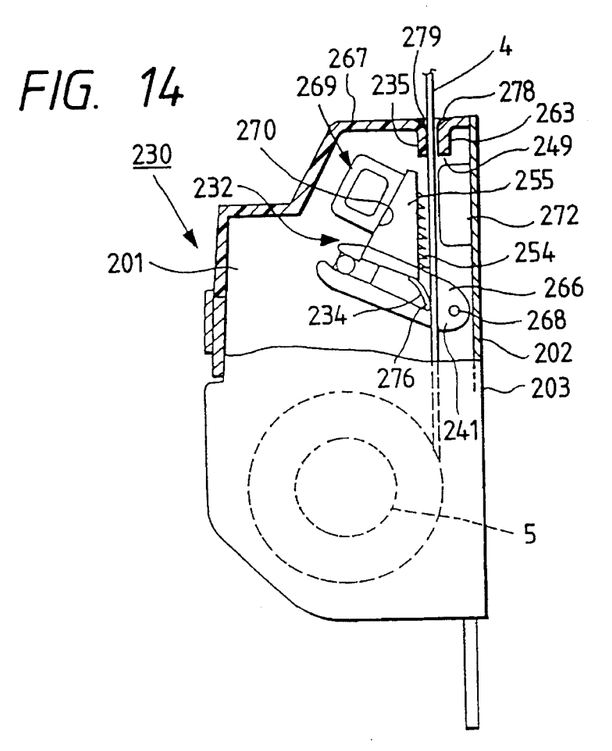
FIG. 14 is a longitudinal sectional view of the retractor equipped with the webbing guide according to the fifth embodiment of the present invention.

FIG. 14 shows a retractor 230 equipped with a webbing guide 263 according to the fifth embodiment of the present invention. The webbing guide 263 according to the fifth embodiment 263 is composed of a first positioning portion 234 and a second positioning portion 235 which are separately provided. The first positioning portion 234 is arranged near the bobbin 5. The second positioning portion 235 is arranged at the position serving as an outlet for the webbing 4. The first positioning portion 234 is formed integrally to an inner lever 266 which is a component of a clamping mechanism 232. The second positioning portion 235 is formed integrally to a dust cover 267 attached to a retractor base 203.

The clamping mechanism 232 according to the fifth embodiment is different from that in the first embodiment. The clamping mechanism 232 is composed of a wedge-shaped clamping member 255 with a large number of clamping protrusions 254 for clamping and engaging the webbing 4, an upper plate 269 for guiding a clamping member 255 to the clamping and engaging position of the webbing 4, a lower plate 272 fixed to a rear plate 202 of a retractor base 203 so as to old the webbing 4 between it and the clamping member 255, and an inner plate 266 for moving the clamping member 255 in a webbing holding direction.

The inner lever 266 is rotatably supported by a pin 268 extended between both side walls 201 of the retractor base 203. In an emergency, the inner lever 266 swings around the pin 268 in linkage with an emergency locking mechanism (not shown) so that the wedge-shaped clamping member 255 having a large number of clamping protrusions 254 is moved against a forcing strength of a spring member (not shown). Thus, the clamping member 225 slides upwards along a guide surface 270 to encroach between the guide surface 270 of the upper plate 269 and the lower plate 272 so that the webbing 4 is held between itself and the lower plate 272. This prevents the webbing 4 from being drawn out.

Figure 15:
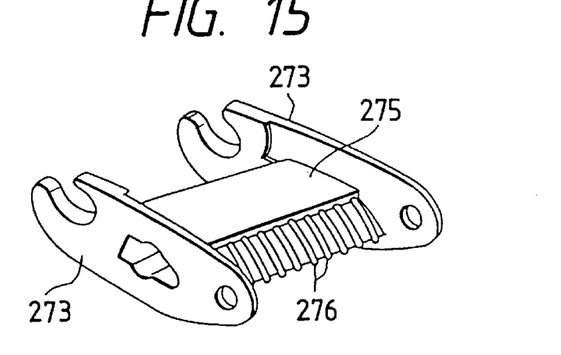
FIG. 15 is an enlarged view of a main part of the webbing guide according to the fifth embodiment of the present invention.

The inner lever 266 has such a structure as shown by a perspective view of FIG. 15. On the upper surface at the rear end of a cylindrical block 275 connecting a pair of left and right lever plates 273, a first protrusion portion 276 is formed which has a plurality of protrusions having the smooth bending surfaces in contact with the webbing 4. The first protrusion portion 276 serves as a first positioning portion 234. The respective protrusions of the first protrusion portion 276 are formed at regular intervals. Further, the first positioning portion 234 includes the pin 268 which is a rotating center of the inner lever 266 attached to the retractor base 203 which forms, between itself and the first protrusion portion 276, a first through-hole 241 through which the webbing 4 is inserted.

Figure 16:
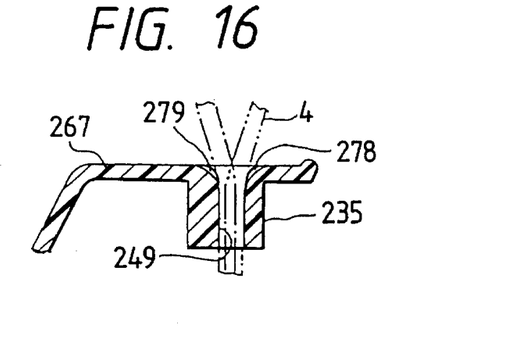
FIG. 16 is an enlarged view of another main part of the webbing guide according to the fifth embodiment of the present invention.

On the other hand, a dust cover 267 made of resin covers the outer periphery of the retractor base 203 to prevent dust from entering into the clamping mechanism. The dust cover 267 is attached to the retractor base 203. The second positioning portion 235 is formed integrally to the dust cover 267 and, as shown in FIG. 16, has a second though-hole 249 for inserting the webbing 4.

Further, as in the first and second embodiments, the second positioning portion 235 has the second and third bending plate portions having the second protrusion portion 278 and third protrusion portion 279 each having a plurality of protrusions which abut on the surface of the webbing 4.

In this embodiment also, as in the, first to fourth embodiments, in the first and second positioning portions 234 and 235, the first to third protrusion portions each including a plurality of protrusions having the smooth bending surfaces in contact with the webbing 4 can improve the sliding of the webbing 4.

In the embodiments described above, although all the protrusions at the positioning portions abutting on the webbing 4 are formed in a convex strip shape extending in a length direction of the webbing 4, the shape of each protrusion is not limited to the shape in the embodiments described above. For example, each protrusion may be a cylindrical shape with a smooth spherical surface at its end.

Further, although the above-described embodiments have been applied to the retractor equipped with a clamping mechanism, the present invention can be applied to the retractor that lacks a clamping mechanism.

As described above, according to the retractor of the present invention, the positioning portion of the webbing guide abutting on the surface of the webbing is formed by a protrusion portion having a plurality of protrusions which are arranged separately from one another, and the surface of each protrusion in contact with the webbing forms a smooth bending face. In comparison with the conventional webbing guide in which a continuous simple bending face abuts on the surface of the webbing, the webbing guide according to the present invention can greatly decrease the contact area of the positioning portion with the webbing and in prove smoothness between the positioning portion and the webbing. Thus, regardless of changes in the winding amount of a webbing in the retractor, direction of drawing out the webbing from the retractor due to the arrangement format of the retractor, etc., the retractor according to the present invention provides a small change in the contact resistance between the webbing and the webbing guide for positioning the webbing in a retractor base and can maintain smoothness of the drawing out and winding operations of the webbing, thereby improving the reliability of the draw-out and winding operations in the retractor and also general versatility of the retractor.

What is claimed is:

1. A retractor for a seat belt, comprising:

a retractor base;

a bobbin fixed to a winding shaft rotatably supported to said retractor base; a webbing, at least a portion of the webbing being wound on the bobbin; and a webbing guide fixed to said retractor base for regulating a webbing moving path so that the webbing wound around said bobbin is drawn out from a predetermined position on said retractor base, said webbing guide including a stationary first positioning portion located on an end of the webbing guide that is closest to said bobbin in a longitudinal direction along a length of the webbing and a second positioning portion located on an end of the webbing guide that is opposite to said first positioning portion in the longitudinal direction, wherein each of said first and second positioning portions include a plurality of protrusions which are formed at intervals in a width direction of the webbing and each of said protrusions having a linear portion which extends in the longitudinal direction, each of the protrusions of said first positioning portion including a first end that is closest to said bobbin and which extends from said linear portion each of the protrusions of said second positioning portion including a second end that is opposite to the first end and which extends from said linear portion in the longitudinal direction, the first and second ends being bent in a direction away from the webbing with respect to a thickness direction of the webbing.

2. The retractor of claim 1, wherein said retractor base includes a pair of side wall portions in opposition to each other for supporting said winding shaft and a rear plate connecting said side wall portions, said first positioning portion has a plurality of first protrusions which are formed in a surface that is close to said rear plate in the thickness direction of the webbing, and wherein said second positioning portion has, a plurality of second protrusions which are formed in a surface that is close to said rear plate in the thickness direction of the webbing, and a plurality of third protrusions in opposition to said second protrusions through the webbing.

3. The retractor of claim 2, wherein the protrusions of each of said first, second and third protrusions are formed at regular intervals in said width direction of the webbing, and have tapered ends in said longitudinal direction of the webbing, and a surface of each of the protrusions abutting on the webbing, said protrusion having a smooth bending face formed thereon.

4. The retractor of claim 2, wherein said first positioning portion includes a cylindrical holding rod forming a through-hole for inserting the webbing between said holding rod and said first protrusions.

5. The retractor of claim 2, wherein said first, second and third protrusions are formed at regular intervals in said width direction of the webbing, a longitudinal end of each of the protrusions abutting on the surface of the webbing and bent away from the webbing in said thickness direction, a concave portion between the protrusions so formed that a groove having a predetermined depth is cut over a predetermined distance in the longitudinal direction.

6. The retractor of claim 1, wherein said first positioning portion has a first bending plate bent toward a rear plate of said retractor base, a fourth bending plate facing with and bent opposite to said first bending plate, and a first protrusion portion and a fourth protrusion portion provided on said first bending plate and said fourth bending plate, respectively, said first and fourth protrusion portions being provided with a plurality of protrusions abutting on a surface of the webbing, and wherein said second positioning portion includes a second bending plate bent toward the rear plate of said retractor base, a third bending plate facing with and bent opposite to said second bending plate, and a second protrusion portion and a third protrusion portion provided on said second bending plate and said third bending plate, respectively, said second and third protrusion portions each being provided with a plurality of protrusions abutting on the surface of the webbing.

7. The retractor of claim 6, wherein the protrusions of each of said first, second and third protrusion portions are formed at regular intervals in said width direction of the webbing, and have tapered ends in said longitudinal direction of the webbing, and a surface of each of the protrusions abutting on the webbing and having a smooth bending face formed thereon.

8. The retractor of claim 6, wherein the protrusions of each of said first, second and third protrusion portions are formed at regular intervals in said width direction of the webbing, a longitudinal end of each of the protrusions abutting on the surface of the webbing and receding so as to extend away from the webbing, and a concave portion between the protrusions is so formed that a groove having a predetermined depth is cut over a predetermined distance in the longitudinal direction.

9. A retractor for a seat belt, comprising:

a retractor base including a pair of side wall portions in opposition to each other and a rear plate connecting said side wall portions;

a bobbin fixed to a winding shaft that is rotatably supported to said side wall portions of said retractor base;

a webbing, at least a portion of the webbing being wound on bobbin; and a webbing guide fixed to said retractor base so that the webbing wound around said bobbin can be drawn out from a predetermined position on said retractor base through said webbing guide, wherein said webbing guide includes:

a stationary first positioning portion having a plurality of first protrusions which are located on an end of the webbing guide that is closest to said bobbin in a longitudinal direction along a length of the webbing, sad first protrusions being formed in a surface of said webbing guide that is close to said rear plate in a thickness direction of the webbing, said first protrusions being formed at intervals in a width direction of the webbing and each of said first protrusions having a linear portion extending in the longitudinal direction, each of said first protrusions including a first end that is close to said bobbin, the first end extending from said linear portion and being bent in a direction away from the webbing with respect to the thickness direction of the webbing; and a second positioning portion having a plurality of second protrusions which are located on an end of the webbing guide opposite to said first positioning portion in the longitudinal direction and which are formed in a surface of said webbing guide close to said rear plate in the thickness direction and a plurality of third protrusions in opposition to said second protrusions through the webbing, said second and third protrusions being formed at intervals in the width direction and each of said second and third protrusions having a linear portion extending in the longitudinal direction, each of said second and third protrusions including a second end opposite to the first end of said respective first protrusions in the longitudinal direction, the second ends extending from said linear portions of said second and third protrusions in the longitudinal direction and being bent in a direction away from the webbing with respect to the thickness direction.

10. The retractor of claim 9, wherein the protrusions of each of said first, second and third protrusions are formed at regular intervals in a width direction of the webbing, and have tapered ends in said longitudinal direction of the webbing, and a surface of each of the protrusions abutting on the webbing and having a smooth bending face formed thereon.

11. The retractor of claim 9, wherein said first positioning portion includes a cylindrical holding rod forming a through-hole for inserting the webbing between said holding rod and said first protrusions.

12. The retractor of claim 9, wherein said first, second and third protrusions are formed at regular intervals in said width direction of the webbing, a longitudinal end of each of the protrusions abutting on the surface of the webbing and bent away from the webbing in said thickness direction, a concave portion between the protrusions so formed that a groove having a predetermined depth is cut over a predetermined distance in the longitudinal direction.

* * * * *